Nov. 20, 1956 — E. H. HANKEY — 2,770,836
PRESSURE HEAD FOR EXTRUDERS
Filed June 10, 1953 — 2 Sheets-Sheet 1

INVENTOR.
ERNEST H. HANKEY
BY
ATTORNEY

Nov. 20, 1956  E. H. HANKEY  2,770,836
PRESSURE HEAD FOR EXTRUDERS
Filed June 10, 1953  2 Sheets-Sheet 2

INVENTOR.
ERNEST H. HANKEY
BY Carl G. Ries
ATTORNEY

United States Patent Office 2,770,836
Patented Nov. 20, 1956

2,770,836
PRESSURE HEAD FOR EXTRUDERS

Ernest H. Hankey, Springfield, Mass., assignor to Monsanto Chemical Company, St. Louis, Mo., a corporation of Delaware Application June 10, 1953, Serial No. 360,678

6 Claims. (Cl. 18—12)

This invention relates to apparatus for the continuous extrusion of thermoplastic materials. More particularly, this invention relates to apparatus including an adjustable pressure head for use in the continuous extrusion of thermoplastic materials.

Conventional extruders for thermoplastic materials comprise, generally, an elongate hollow casing provided with heating means, a driven rotatable screw mounted therein and an extrusion orifice of restricted size fixed to the outlet end of the casing. Through the use of apparatus of this general construction it is possible to work a wide variety of synthetic thermoplastic materials and formulations containing such materials. As a general rule, the thermoplastic material is fed into the extruder in a solid granular condition alone or in physical admixture with plasticizers, colorants, fillers, etc. As the thermoplastic material is forced through the bore of the extruder by the screw, it is heated to a plastic condition and, while plastic, is colloided and blended with such additives as may be present in order to form a homogeneous composition.

Generally speaking, only limited operating temperatures can be employed if satisfactory colloiding at a reasonable production rate is to be obtained. The practical operating temperature for a given material is usually not far below the temperature at which the material will decompose and, as a result, it is necessary to use a properly designed screw that will provide for substantially continuous flow of the thermoplastic material through the extruder. If flow is discontinuous, dead areas form within the casing and those portions of the thermoplastic material lodged even temporarily within such dead areas will tend to decompose, thus adversely affecting the quality of the product extruded.

The design of the screw is also limited by the fact that the necessary colloiding and malaxation of the thermoplastic material must be achieved within an overall prescribed dwell time within the extruder. If dwell time is too short, the thermoplastic material will be insufficiently colloided and the extruded product will not be homogeneous. If dwell time is unduly prolonged, the material in the bore will tend to become degraded through decomposition. As a general rule, the degree of colloiding required and the safe dwell time will vary for each thermoplastic material and, frequently, for different formulations based thereon. Consequently, a screw of a given design will generally extrude only one formulation with efficiency and if a different formulation is to be extruded, it is usually necessary to either use a different screw or to modify the design of the extruder by the addition of breaker plates and screens in order to permit the use of the same screw under different operating conditions. Extruder screws are costly and since it is impractical to stock a wide variety of screws, the latter alternative is commonly employed.

Limited versatility can be achieved with a screw of a given design by mounting breaker plates and screens intermediate the end of the screw and the extrusion orifice. When this is done, the back pressure on the thermoplastic material in the bore of the extruder is increased, thereby increasing dwell time so that the thermoplastic material is subjected to increased colloiding. In order to effectively increase back pressure, it is generally necessary to use a plurality of screens, at least some of which are usually of fine mesh (e. g. 120 mesh). Moreover, extrusion operations must be interrupted in order to install, clean or replace such breaker plates and screens. The use of breaker plates and screens is not an entirely satisfactory expedient. As mentioned previously, in order to prevent degradation, a thermoplastic material should flow through an extruder in a substantially continuous manner. When breaker plates are mounted between the end of the screw and the extrusion orifice, the flow pattern is disturbed and this often causes the formation of dead areas in which the thermoplastic material will be decomposed.

Frequently, it is necessary to remove impurities from a formulation during extrusion operations and when such is the case, screens and breaker plates are used for this purpose even though the screw is of proper design. However, when the screening of impurities is the only object to be achieved, the screens are usually fewer in number and of coarse mesh (e. g. 60 mesh) so that back pressure is not materially affected. Further, such coarse mesh screens do not clog as rapidly as do the fine mesh screens used to increase back pressure. Consequently, fine mesh screens are not used with advantage when extruding impure formulations since they must be cleaned or replaced much more frequently than coarse mesh screens.

A further difficulty is encountered with conventional extruders when an occasional batch of off-grade material is passed therethrough. Since an extruder of a given design will generally process only one formulation with efficiency, the off-grade material will not be properly colloided. Generally, such material must be discarded as it is usually impractical to interrupt operations in order to modify the design of the extruder through the addition or subtraction of breaker plates and screens or the installation of a different screw.

From the foregoing, it is seen that the operating design of an extruder cannot be modified without the addition, subtraction or substitution of parts and that such modifications cannot be made while the machine is in operation. Moreover, it is seen that the use of breaker plates and screens to increase back pressure is not entirely satisfactory and presents many problems.

Accordingly, an object of the present invention is the provision of apparatus that can be used for the extrusion of a variety of thermoplastic materials without the addition, subtraction or substitution of parts.

Another object is the provision of apparatus for the extrusion of thermoplastic materials that can be adjusted to provide for different operating conditions while the machine is in operation.

A further object is the provision of means for either increasing or decreasing back pressure in the bore of an extruder while the machine is in operation.

The manner in which these and other objects are attained will be apparent from the following detailed description of a specific embodiment of the present invention, when read in conjunction with the accompany drawings in which.

Figure 2:
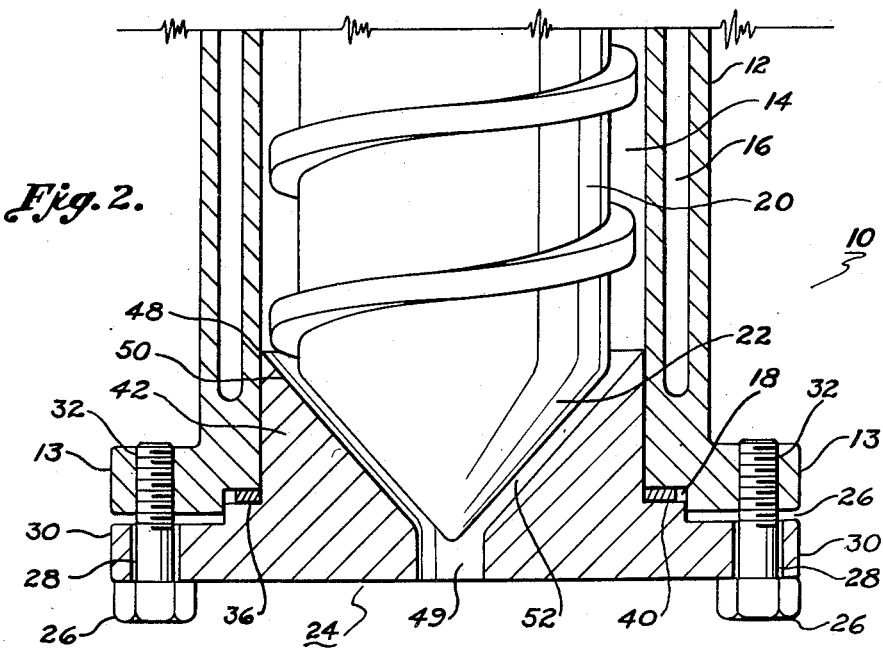
Figure 2 is a fragmentary side elevation, partly in section, of the outlet end of an extruder having mounted thereon the pressure head shown in Figure 1.
Figure 3:
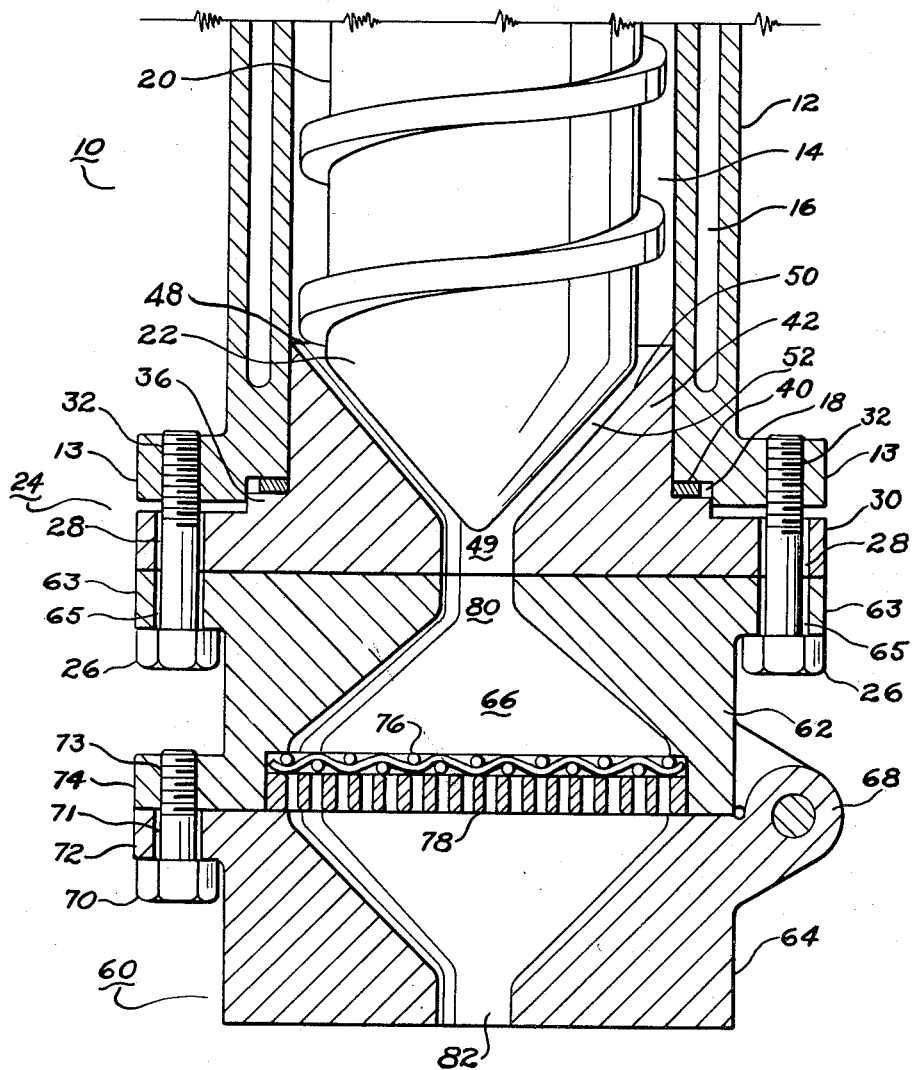
Figure 3 is a fragmentary side elevation, partly in section, of the outlet end of an extruder having mounted thereon a pressure head constructed in accordance with the modified form of the present invention.

Turning now to the drawings and especially to Figures 2 and 3, numeral 10 designates, generally, an extruder comprising a casing 12 defining a lengthwise cylindrical bore 14. Means are provided for heating thermoplastic material in the bore 14 such as, for example, chamber 16 in which hot oil or any other suitable heating medium is circulated. The outlet end of the casing 12 is provided with a flange 13 and, preferably but not necessarily, with a recessed shoulder 18. A screw 20 having a conical end section 22 is rotatably mounted in the bore 14 by any suitable means (not shown).

Any conventional extruder of this general construction may be used in the practice of the present invention, it only being necessary that the conical end section 22 of the screw 20 be of proper design. The conical end section 22 should have an included angle at the apex thereof which is not in excess of more than about 120° and which is preferably from about 80° to 100°. Stated differently, the slant height of the conical end section should be less than twice the altitude thereof. The diameter of the conical end section 22 at the base thereof should be less than the diameter of the bore 14 and preferably equal to the root diameter of the screw 20. Generally speaking, the root diameter of the screw 20 will be greater than about ¾ of the diameter of the bore 14 as shown in the drawings.

Figure 1:
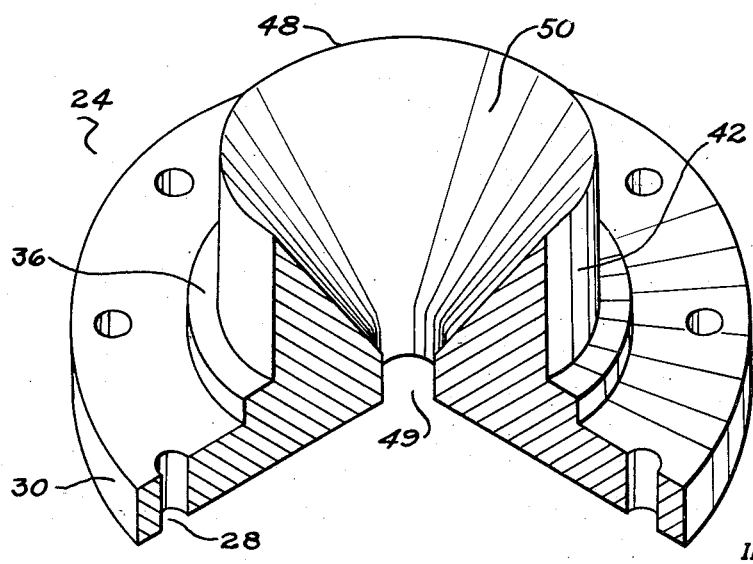
Figure 1 is a perspective view, with parts broken away, of a pressure head constructed in accordance with the present invention.

In accordance with the present invention, the back pressure exerted on thermoplastic material in the bore 14 of the extruder 10 is regulated through the use of a pressure head of novel construction which is adjustably mounted on the casing 12. The pressure head also serves as a casing-closure member. A pressure head (casing closure member) 24, embodying the present invention, is shown in detail in Figure 1.

The pressure head 24 is adjustably mounted on the casing 12 for movement relative thereto by any suitable means such as, for example, a plurality of bolts 26 passing through openings 28 in the flange portion 30 of the pressure head 24 and threaded through openings 32 in flange 13 of the casing 12. The pressure head 24 is preferably provided with a shoulder 36 shaped so that the side wall thereof will be in sliding engagement with the side wall of the recessed shoulder 18 in the outlet end of the casing 12. A packing 40 of any suitable compressible material such as fibrous asbestos is preferably interposed between the faces of the shoulders 18 and 36.

The pressure head 24 is provided with a cylindrical portion 42, the diameter of which should be substantially equal to the diameter of the bore 14 so that the cylindrical surface of the cylindrical portion 42 will be in sliding engagement with the surface of the bore 14. A female frusto-conical recess defined by the wall 50 is formed in the end of the cylindrical portion 42. The base or maximum diameter of the frustro-conical recess should be substantially equal to the diameter of the cylindrical portion 42 and the bore 14. By adopting this construction, the rim 48 of the cylindrical portion 42 will be deformable to a limited extent. As a result, the pressure exerted on the rim 48 by the thermoplastic material in the bore 14 will force it into sealing engagement with the surface of the bore 14 in order to provide a primary seal which will prevent thermoplastic material from leaking past the cylindrical surface of the cylindrical portion 42. The shoulder 36 and the packing 40 provide a supplementary means for preventing leakage and, while it is preferable to provide such supplemental means, the shoulder 36 and packing 40 may be dispensed with if desired.

An extrusion orifice 49 of any suitable cross-sectional configuration leads from the apex of the frusto-conical recess through the pressure head 24 for the delivery of thermoplastic material forced through the bore 14 by the screw 20.

The included angle formed by the wall 50 of the frustro-conical recess should be substantially equal to the included angle at the apex of the conical end section 22 of the screw 20 so that the side wall 50 will be substantially parallel with the surface of the conical end section 22 when the pressure head 24 is operably mounted on the casing 12. Normally, conical end section 22 will extend into the frustro-conical recess in spaced relationship thereto in order to form a passage 52 of restricted width leading to the extrusion orifice 49.

The back pressure exerted on thermoplastic material in the bore 14 will be determined by the width of the passage 52. As a result, back pressure can be effectively increased or decreased during extrusion operations by moving the pressure head 24 relative to the casing 12 in order to vary the width of the passage 52.

A further advantage is derived from the use of a pressure head construction in accordance with the present invention. Rotation of the conical end section 22 of the screw 20 during operations will cause a milling action to be exerted on thermoplastic material in the passage 52 and, as a result, any small lumps of uncolloided material which may remain in the thermoplastic material at the time it is forced through the passage 52 will be malaxated and homogeneously blended with the balance of the material. This further insures the delivery of a homogeneous material through the extrusion orifice 49.

It is sometimes desirable to extrude impure formulations that require screening and when such is the case, a somewhat modified structure such as that shown in Figure 3 may be used. In the illustrated modification, a strainer 60 of any suitable construction is fixed to the pressure head 24 for movement therewith relative to the casing 12 by any suitable means.

The strainer 60 shown in Figure 3, for purposes of illustration, comprises a base member 62 and a cover member 64 defining therebetween a chamber 66 of any suitable dimensions. Usually, the diameter of the chamber 66 will be substantially equal to the diameter of the bore 14. In order to secure the strainer 60 to the pressure head 24, the base member 62 is provided with a flange 63 and the bolts 26 are passed through openings 65 therein, the bolts 26 passing through the openings 28 in the pressure head 24 and being threaded through the openings 32 in the flange 13. The cover member 64 is movably mounted on the base member 62 by any suitable means such as hinge 68, a tight seal being effected by bolt 70 passing through opening 71 in a lug 72 fixed to the cover member 64 and threaded through opening 73 in a similar lug 74 fixed to the base member 62. A suitable straining means, such as a coarse mesh screen 76 and a supporting breaker plate 78 is positioned within the chamber 66. Thermoplastic material to be strained enters the chamber 66 through inlet orifice 80 in the base member 62 and the strained material is delivered through outlet orifice 82 in the cover member 64.

Operation

Prior to the commencement of extrusion operations, the pressure head 24 is adjusted by turning bolts 26 so that the clearance between the conical end section 22 of the screw 20 and the wall 50 of the frustro-conical recess will define a passage 52 of the desired width.

When extrusion operations are to begin, power is delivered to the screw 20 for rotation of the same, hot oil or a similar heating medium is circulated through the chamber 16 and a thermoplastic material or a formulation based thereon is fed to the bore 14 of the extruder 10 by any suitable means (not shown). Rotation of the screw 20 will colloid the thermoplastic material and force it through the bore 14. From the bore 14, the thermoplastic material is forced through the passage 52 and thence out of the extruder 10 through the extrusion orifice 49. While passing through the passage 52, the thermoplastic material will be subjected to an additional milling action due to rotation of the conical end section 22.

The pressure of the thermoplastic material in the bore 14 of the extruder 10 will force the lip 48 of the cylindrical portion 42 of the pressure head 24 into sealing engagement with the surface of the bore 14 and this will normally prevent thermoplastic material from leaking past the cylindrical wall 44 of the cylindrical portion 42 and out the end of the casing 12. However, as a precautionary measure, an additional sealing means in the form of shoulders 18 and 36 is preferably provided. In the event that thermoplastic material should be forced past the cylindrical wall of the cylindrical portion 42, such material will force the packing 40 into sealing engagement with the face of the shoulder 36, thus preventing leakage past the side wall thereof.

By observing the thermoplastic material extruded through the orifice 49, it is possible to visually determine the extent to which it has been colloided. If the material shows signs of degradation, dwell time is too long and back pressure should be decreased. This is accomplished by moving the pressure head 24 outwardly relative to the casing 12 and away from the screw 20 so as to increase the width of the passage 52. If the material contains small particles of uncolloided material as it leaves the extrusion orifice 49, it is being insufficiently colloided and in this case the back pressure should be increased. In order to increase back pressure, the pressure head 24 is moved towards the screw 20 in order to diminish the width of the passage 52. Since the pressure head 24 is mounted on the casing 12 by means of bolts 26, it is not necessary to suspend operations while making the necessary adjustments. If it should happen that an off-grade formulation is fed to the extruder 10, such material may be satisfactorily processed without interrupting operations by adjusting the pressure head 24 in order to either increase or decrease the width of the passage 52.

If an impure formulation is to be extruded, the strainer 60 (Figure 3) is fitted to the pressure head 24 by means of bolts 26. When this is done, the thermoplastic material will flow through the extrusion orifice 49 of the pressure head 24 and the inlet orifice 80 of the strainer 60 into the chamber 66 where it will pass through the screen 76, breaker plate 78, and out through the orifice 82. Foreign matter will be retained by the screen 76.

Accurate control of extrusion operations is possible even when a strainer similar to the strainer 60 is mounted on the pressure head 24. The screen 76 and breaker plate 78 within the chamber 66 will have no substantial effect on back pressure. Accordingly, improper colloiding can be detected by visually observing the material leaving the outlet orifice 82. The degree of colloiding can be modified without interrupting continuous operations by moving the pressure head 24 and the strainer 60 relative to the casing 12 in order to bring about the desired increase or decrease in back pressure.

When the screen 76 is to be cleaned or replaced, operations are temporarily interrupted. The bolt 70 is loosened and the cover member 64 is swung about the hinge 68 in order to provide ready access to the screen 76 and breaker plate 78 in the chamber 66.

From the foregoing, it is seen that the use of a pressure head constructed in accordance with the present invention makes possible accurate control of the extrusion of thermoplastic materials without the necessity of interrupting extrusion operations and without the addition or substitution of parts.

Pressure heads constructed in accordance with the present invention are used with particular advantage on large size extruders such as extruders having a 6″ or 8″ bore. Since the pressure head is directly mounted on the casing and is of a relatively simple construction, it is not necessary to use heavy reinforcing members and no difficulties are encountered in installing or adjusting the pressure head.

Having thus described my invention, what I claim is:

1. In a plastic extrusion device having a screw rotatably mounted in the bore of a casing, the improvement which comprises a conical tip on the discharge end of the screw, said conical tip having a base diameter substantially equal to the root diameter of the screw and a slant height equal to less than about twice the altitude thereof, and a casing-closure member adjustably mounted on the discharge end of the casing, said casing-closure member having a cylindrical portion in the bore of the casing, the cylindrical surface of said portion being in sliding engagement with the wall of said bore, said cylindrical portion being provided at the inner end thereof with a frustro-conical recess spaced from and parallel with the conical tip of the screw, the surface of said frustro-conical recess converging with the said cylindrical surface to define a sealing lip therebetween.

2. A device for extruding plastic materials comprising an elongate casing having a lengthwise cylindrical bore, a screw rotatably mounted in said bore, said screw having a root diameter greater than about ¾ the diameter of the bore and terminating adjacent the outlet end of said bore in a conical tip, said conical tip having a base diameter substantially equal to the root diameter of the screw, the slant height of said conical tip being less than about twice the altitude thereof, and a casing-closure member adjustably mounted on the discharge end of said casing, said casing-closure member having a cylindrical portion in the bore of said casing, the cylindrical surface of said portion being in sliding engagement with the wall of said bore, said cylindrical portion being provided at the inner end thereof with a frustro-conical recess spaced from and parallel with the conical tip of said screw, the surface of said frustro-conical recess converging with the said cylindrical surface to define a sealing lip therebetween.

3. A device as in claim 2 including a strainer affixed to the casing-closure member.

4. A device for continuously extruding thermoplastic materials comprising an elongate casing having a lengthwise cylindrical bore provided with an outlet end, means for heating thermoplastic material within said bore, a driven screw rotatably mounted in said bore for forcing thermoplastic material therethrough, said screw having a root diameter greater than about ¾ the diameter of said bore and terminating adjacent the outlet end of said casing in a conical end section, the included angle at the apex of said conical end section being from about 80° to 100° and the base diameter of said conical end section being substantially equal to the root diameter of said screw, a casing-closure member having a cylindrical portion positioned within said bore, the cylindrical surface of said portion being in sliding engagement with the wall of said bore, said cylindrical portion being provided at the inner end thereof with a frustro-conical recess spaced from and parallel with the conical tip of the screw, the surface of said frustro-conical recess converging with the said cylindrical surface to define a sealing lip therebetween, and means interconnecting said casing-closure member and said casing for moving the former relative to the latter.

5. A device as in claim 4 having a strainer fixed to the casing-closure member.

6. A device as in claim 4 having a strainer fixed to the casing-closure by the same means interconnecting the casing-closure member and the casing.

References Cited in the file of this patent

UNITED STATES PATENTS

| | | |
|---|---|---|
| 1,516,843 | Buttfield | Nov. 25, 1924 |
| 2,403,476 | Berry et al. | July 9, 1946 |
| 2,488,189 | Hanson | Nov. 15, 1949 |
| 2,537,977 | Dulmage | Jan. 16, 1951 |
| 2,541,201 | Buecken et al. | Feb. 13, 1951 |
| 2,593,265 | Chase et al. | Apr. 15, 1952 |
| 2,660,302 | Gersmann | Nov. 24, 1953 |
| 2,683,897 | Patterson | July 20, 1954 |

FOREIGN PATENTS

| | | |
|---|---|---|
| 836,818 | Germany | Apr. 17, 1952 |